R. Heys,
Steam-Engine Valve-Gear.
No 43,114. Patented June 14, 1864.
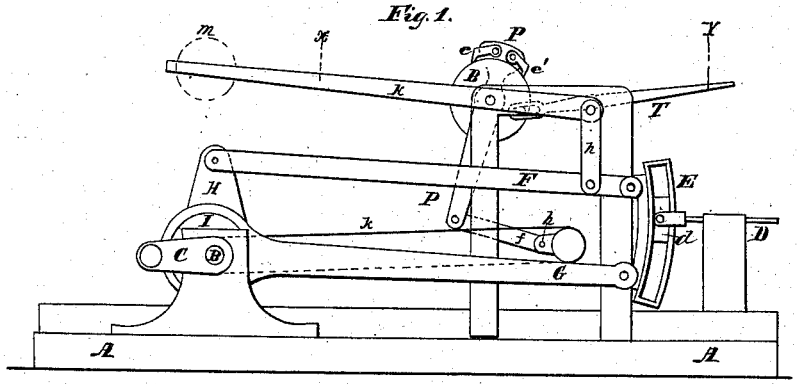
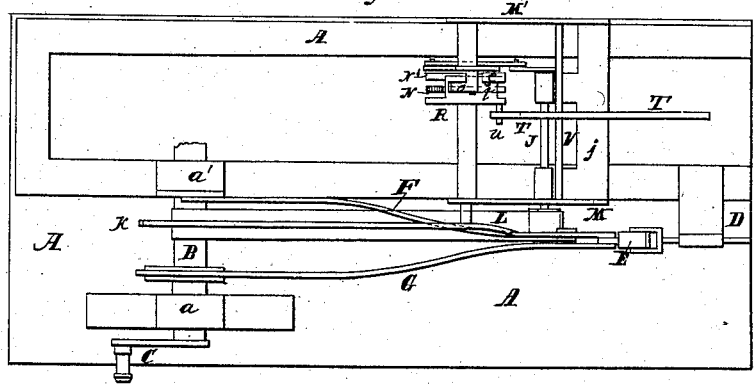
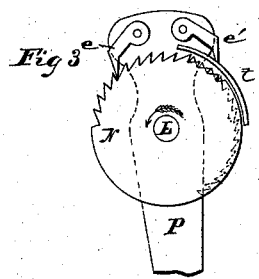
Witnesses:
Inventor:

UNITED STATES PATENT OFFICE.

ROBERT HEYS, OF PHILADELPHIA, PENNSYLVANIA.

IMPROVEMENT IN VALVE-GEAR FOR STEAM-ENGINES.

Specification forming part of Letters Patent No. 43,114, dated June 14, 1864.

*To all whom it may concern:*

Be it known that I, ROBERT HEYS, of Philadelphia, Pennsylvania, have invented a Variable Valve-Motion for Steam-Engines; and I do hereby declare the following to be a full, clear, and exact description of the same, reference being had to the accompanying drawings, and to the letters of reference marked thereon.

My invention consists of certain novel mechanism, fully described hereinafter, whereby the governor of a steam-engine is made to so regulate the extent of the movement of the valve that it shall be commensurate with the speed of the engine.

In order to enable others skilled in the art to make and use my invention, I will now proceed to describe its construction and operation.

On reference to the accompanying drawings, which form a part of this specification, Figure 1 is a side view of my improved variable valve-motion for steam engines; Fig. 2, a plan view; and Fig. 3, a detached view of part of the motion, drawn to an enlarged scale.

Similar letters refer to similar parts throughout the several views.

A represents part of the base-plate of a horizontal steam-engine, B being the usual crank-shaft, turning in suitable boxes, a and a', and C the crank.

D represents part of the spindle of a slide-valve, the outer end of this spindle being jointed to a block, d, which fits snugly in a link, E, the latter being connected near its upper end to the arm F, and near its lower end to the eccentric-rod G, the opposite end of the arm F being jointed to a plate, H, secured to the box a', or to any permanent part of the engine, and the rod G embracing an eccentric, I, on the crank-shaft B. The arm F is connected by a link, h, to the short arm of the lever K, which is secured to a shaft, L, arranged to turn in the opposite frames M and M', which are secured to the base-plate of the engine. It should be here understood that the long arm of the lever K is provided with a weight sufficient to balance that of the arm F, eccentric-rod G, and link E, so that these parts can be readily raised and lowered by the application of a very slight force. To the shaft L are secured the two ratchet-wheels N and N', the teeth of one wheel being inclined in a direction contrary to that of the teeth of the other. A pawl, e, is arranged to engage into the teeth of the wheel N, and a similar pawl, e', into the teeth of the wheel N', both pawls being hung to the short arm of a lever, P, which is arranged to vibrate freely on the shaft L, and the long arm of which is connected by a rod, f, to a crank, h, on a shaft, J, which turns in projections on a cross-bar, j, secured between the frames M and M', the shaft in the present instance being driven by a belt, k, passing round a pulley on the shaft and round the crank-shaft. A disk, R, is fitted loosely to and arranged to vibrate freely on the shaft L in front of the ratchet-wheels, and from the inside of this disk projects a curved plate or shield, t, which is in close contiguity to, but not in actual contact with, the edges of the wheels, and which overhangs the same, as seen in Fig. 2. A pin, u, projects from the disk R, and passes through an elongated opening in the short arm of the lever T, which is secured to a shaft, V, the latter being arranged to vibrate in the frames M and M'. It should be here understood that the ratchet-wheel, pawls, and other appliances connected therewith may be dispensed with, and that the governor-rod may be connected to the weighted lever K—say at the line X. It will be evident that when the point where the arm F is connected to the link E coincides with the valve-spindle D the latter will have no movement, and that when the point where the eccentric-rod is connected to the link coincides with the valve-spindle the movement of the latter will be greatest. The link will, through the weighted lever K and the governor-rod X, be raised or lowered accordingly as the speed of the engine is increased or diminished, and consequently the movement of the valve and the admission of steam to the cylinder will be commensurate with the speed of the engine. I prefer, however, in engines of the larger class to connect the governor-rod to the lever T—say at the point Y—and to use the pawl-and-ratchet arrangement described above. A constant vibrating motion being imparted to the lever P, the action of the pawls e and e' on the ratchet-wheels N and N' would, in the absence of the disk R and its projection t, be such as to turn the shaft L first in one direction and then in the other, and thereby to raise and lower the link E continually. It will be observed, how ever, that the position of the projection or shield t depends upon the action of the governor, and that at times the shield may be moved to such a position as to prevent the pawl e' from acting on the wheel N' while the pawl e is acting on the wheel N, in which case the shaft L will be turned in the direction of the arrow, and the link E will be raised. In like manner the pawl e might be rendered inoperative by the shield and the pawl e' be permitted to so act on the wheel N' that the link would be lowered, or both pawls might be rendered inactive by the governor, in which case the link will be stationary. The link, in fact, through the medium of the devices described, occupies a position determined by the governor-rod, which consequently determines the extent of movement of the valve.

I claim as my invention and desire to secure by Letters Patent—

1. The valve spindle D of a steam-engine, the link E, eccentric-rod G, and arm F, in combination with the weighted lever K and link h, or their equivalents, whereby the motion of the governor-rod may be imparted to the link, as set forth, for the purpose specified.

2. The wheels N and N', lever P, and pawls e and e', with the shield t, when the position of the latter is regulated by the governor, and when the whole is applied to the raising and lowering of the link E, substantially as and for the purpose herein set forth.

In testimony whereof I have signed my name to this specification in the presence of two subscribing witnesses.

ROBERT HEYS.

Witnesses:
 HENRY HOWSON,
 JOHN WHITE